(12) United States Patent
Villone

(10) Patent No.: US 9,223,525 B2
(45) Date of Patent: Dec. 29, 2015

(54) METHODS AND SYSTEMS FOR IMPLEMENTING A NETWORK-BASED EXTENSIBLE INTERFACE PLATFORM FOR MULTIFUNCTION DEVICES

(71) Applicant: Xerox Corporation, Norwalk, CT (US)

(72) Inventor: Christopher M. Villone, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/272,586

(22) Filed: May 8, 2014

(65) Prior Publication Data

US 2015/0324155 A1 Nov. 12, 2015

(51) Int. Cl.
*G06F 3/12* (2006.01)

(52) U.S. Cl.
CPC ............ *G06F 3/1222* (2013.01); *G06F 3/1236* (2013.01); *G06F 3/1238* (2013.01)

(58) Field of Classification Search
USPC ........................................................ 358/1.13
See application file for complete search history.

(56) References Cited

U.S. PATENT DOCUMENTS

| | | | |
|---|---|---|---|
| 7,987,241 B2 | 7/2011 | St. Jacques, Jr. et al. | |
| 8,341,214 B2 | 12/2012 | Liu et al. | |
| 8,411,304 B2 | 4/2013 | Kibler et al. | |
| 8,531,693 B2 | 9/2013 | Reddy et al. | |
| 2010/0075290 A1 | 3/2010 | DeYoung et al. | |
| 2010/0094925 A1* | 4/2010 | St Jacques, Jr. | H04N 1/00222 709/202 |
| 2010/0149572 A1 | 6/2010 | St. Jacques, Jr. et al. | |
| 2010/0318705 A1* | 12/2010 | Tainaka | G06F 13/4018 710/107 |
| 2010/0328705 A1* | 12/2010 | Kibler et al. | 358/1.15 |
| 2012/0140261 A1* | 6/2012 | DeRoller | G06K 15/1859 358/1.14 |
| 2012/0243029 A1 | 9/2012 | St. Jacques, Jr. et al. | |
| 2013/0268926 A1 | 10/2013 | Colelli et al. | |
| 2014/0226173 A1* | 8/2014 | Tredoux et al. | 358/1.14 |

* cited by examiner

*Primary Examiner* — Ngon Nguyen
(74) *Attorney, Agent, or Firm* — Kermit D. Lopez; Luis M. Ortiz; Ortiz & Lopez, PLLC

(57) ABSTRACT

Methods and systems for accessing a network-based extensible interface platform via multifunction devices. The extensible interface platform can be hosted on a network server accessible via a network in communication with the network server. An access to a device that communicates with the network server via the network can be authenticated in response to invoking a login procedure at the device. An account can be automatically linked to the network server after authenticating access to the device. The extensible interface platform can be loaded onto a local user interface associated with the device to present an extensible interface platform workflow associated with the account even though the extensible interface platform is not installed at the device.

20 Claims, 3 Drawing Sheets

METHODS AND SYSTEMS FOR IMPLEMENTING A NETWORK-BASED EXTENSIBLE INTERFACE PLATFORM FOR MULTIFUNCTION DEVICES

FIELD OF THE INVENTION

Embodiments are generally related to multi-function devices such as, for example, printers, scanners, photocopy machines, and the like. Embodiments are also related to EIP (Extensible Interface Platform) applications and solutions. Embodiments are additionally related to the use of network-based EIP applications for multifunction devices.

BACKGROUND

A MFD (Multi-Function Device) is a rendering device or office machine, which incorporates the functionality of multiple devices in a single apparatus or system, so as to offer a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

An EIP application can be executed on a MFD device to extend its functionality, offer user interface customization and integration between the device and other services based on a private enterprise network, or may be offered publically through, for example, the Internet. Extensibility applications can be written to take advantage of services offered by the device itself, such as the ability to execute a scan, copy a document or render a print job. Such services can be invoked as part of the overall MFD user experience offered. Since the services occur on the device itself, no network discovery or configuration is required when using such services (i.e., they are always available on a local host). If the application wishes to utilize other hardware and resources, assuming that these can be accessed over a network connection, special measures typically need to be taken to discover and establish communication with those services. Such an approach imposes a burden on the application, subjecting it to configuration contingencies.

In general, end users want to be able to use their custom EIP solutions from any device without first having to install the EIP application. They also typically desire to use their EIP solution when they are "on the road" and not in the office. Based on the foregoing, it is believed that a need exists for improved methods and systems for accessing a network-based EIP via a MFD, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for managing a MFD.

It is another aspect of the disclosed embodiments to provide for improved methods and systems for accessing a network-based EIP via one or more multifunction devices.

It is also an aspect of the disclosed embodiments to provide for an improved approach for managing a customized EIP solution.

The aforementioned aspects and other objectives and advantages can now be achieved as described herein. Methods and systems are disclosed herein for accessing a network-based extensible interface platform via multifunction devices. The extensible interface platform can be hosted on a network server accessible via a network in communication with the network server. Access to a device that communicates with the network server via the network can be authenticated in response to invoking a login procedure at the device. An account can be automatically linked to the network server after authenticating access to the device. The extensible interface platform can be loaded onto a local user interface associated with the device to present an extensible interface platform workflow associated with the account even though the extensible interface platform is not installed at the device.

The device can be for example, a multi-function device or other type of device (e.g., a server, a computer, etc.). The networked server generally includes a cloud-based server and the network is preferably provided as a cloud-based network. The extensible interface platform can be hosted on the network server as a file storage and/or synchronization service. The EIP solution hosted on the network server can be loaded on the user interface of the device in order to present the user with specific workflow.

A custom EIP solution can be hosted in the "cloud" via service such as, for example, Google Drive. When a user logs into a MFD, their account can be linked to their Google Drive account and the EIP solution hosted on Google Drive can be loaded on the local UI (User Interface) presenting the user with his or her specific workflow even though the EIP solution was never previously "installed" on the device.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The disclosed embodiments generally describe an approach in which a custom EIP solution is hosted in the "cloud" via service such as, for example, Google Drive. When a user logs into a MFD, their account can be linked to their Google Drive account and the EIP solution hosted on Google Drive can be loaded on the local UI (User Interface) presenting the user with his or her specific workflow even though the EIP solution was never previously "installed" on the device.

Figure 1:
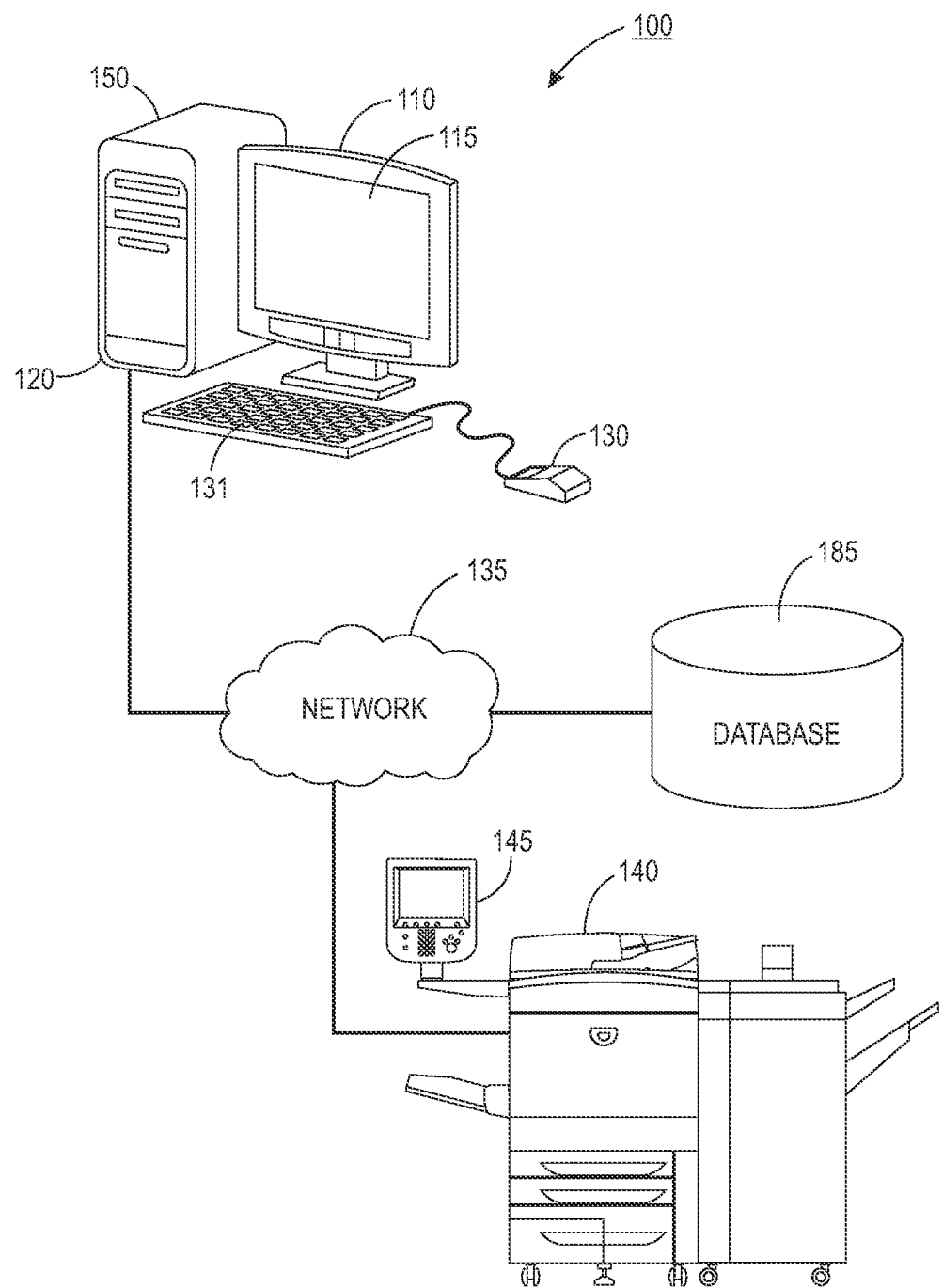
FIG. 1 illustrates an example of a multi-function device coupled to a data-processing apparatus through a network, in accordance with the disclosed embodiments.

Referring to FIG. 1, a sample system 100 is depicted, which includes one or more networked devices, such as a networked device 140 that communicates electronically with a data-processing apparatus 110 through a network 135. The networked device 140 generally includes a user interface 145 (e.g., a user input device, a GUI, etc.) and the EIP application or solution (not shown in the example embodiment of FIG. 1) may be hosted on a network server, such as, for example, the server 235 shown in FIG. 2. The server 235 shown in FIG. 2 may be, for example, a "Google Drive™" or other cloud based server that contains user account information. The Google Drive™ platform is an example of a file storage and synchronization service that allows users to store files in the cloud, share files, and edit documents, spreadsheets, and presentations with collaborators and so on. (Note that Google Drive™ is a trademark of Google Inc.) The associated EIP application is typically stored in their "Google Drive™" or other cloud service account. Thus, the EIP solution or application hosted on the cloud-based drive can be loaded from the location user interface 145 of the device 140. The user interface 145 can be, for example, a full touch screen display similar to, for example, a tablet or smartphone.

In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like). In some embodiments, data-processing apparatus 110 may be a wireless mobile computing device such as, for example, a tablet-computing device, a Smartphone, a PDA (Personal Digital Assistant), laptop computer, etc.

Note that as utilized herein, the term "networked device" may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions, such as scanning, faxing, printing and copying.

The data-processing apparatus 110 can communicate electronically with the MFD 140 (and other rendering devices) through a computer network 135. Network 135 may employ any network topology, transmission medium, or network protocol. The network 135 may include connections, such as wired (e.g., fiber optical cables), wireless communication links (e.g., WiFi, Bluetooth, cellular etc.). In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

The networked MFD 140 can include a user interface 145, such as a panel menu or other GUI (Graphical User Interface). A panel menu graphically displayed by a GUI may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 can also incorporate the use of a GUI for communicating rendering features for processing, for example, to a user and accepting the user's selection of available rendering features. In general, such a user interface displays information and receives data through device display and/or the keyboard/mouse combination. Such an interface can also serve to display results, whereupon the user may supply additional inputs or terminate a given session. Although the data-processing apparatus 110 is shown in FIG. 1 as a desktop computer, it can be appreciated that the data-processing apparatus 110 can be, for example, any computing device capable of being integrated within a network, such as a PDA, a server, a personal computer, a cellular telephone, a point-of-sale terminal, server, etc.

The input unit 145 of the networked device 140 may be, for example, a local user interface, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrators portable device that communicates wirelessly may be, for example, a mobile device such as a Smartphone, a tablet computing device, a laptop computer, etc.

Embodiments can be implemented in the context of the data-processing apparatus 110 and the networked device 140 depicted in FIG. 1. The disclosed embodiments, however, are not limited to any particular application or any particular environment. Instead, those skilled in the art will find that the system and methods of the disclosed embodiments may be advantageously applied to a variety of system and application software, including database management systems, word processors, and the like. Moreover, the present invention may be embodied on a variety of different platforms, including Macintosh, Windows, UNIX, LINUX, and the like, along with mobile/wireless platforms and operation systems. Therefore, the description of the exemplary embodiments, which follows, is for purposes of illustration and not considered a limitation.

Figure 2:
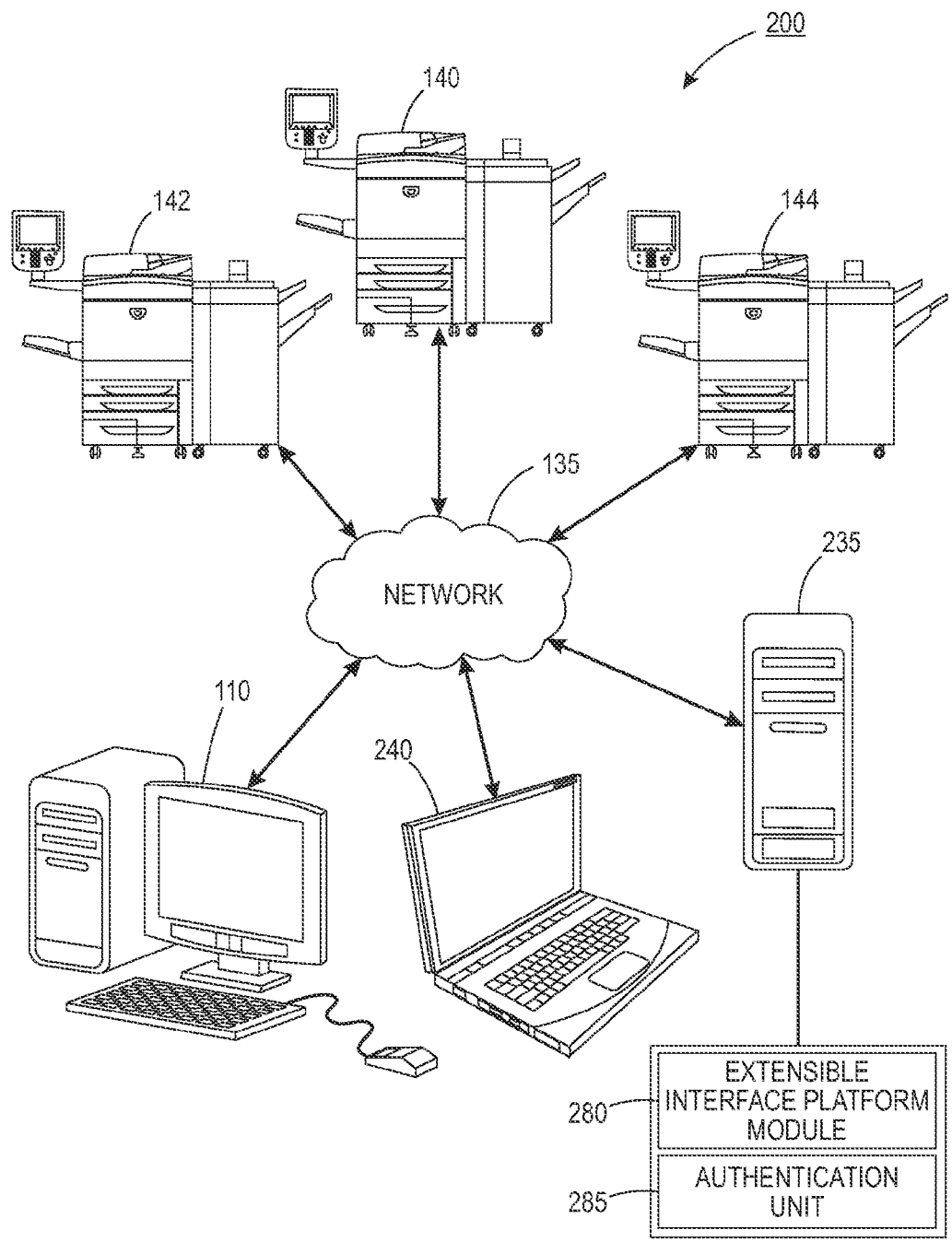
FIG. 2 illustrates a graphical representation of a device management system having an extensible interface platform module associated with a network, in accordance with the disclosed embodiments.

FIG. 2 illustrates a graphical representation of a device management system 200 having an extensible interface platform module 280 associated with the network 135, in accordance with the disclosed embodiments. The device management system 200 generally includes the network infrastructure 135 associated with one or more networked MFDs 140, 142, and 144, data-processing system 110, a laptop 240, and an EIP server 235. Data-processing apparatus 110 depicted in FIG. 1 can be, for example, a server. Other devices such as, for example, desktops, network devices, palmtops, mobile phones, etc., may also be included in the network 135, as service providers. The MFDs 140, 142, and 144 can be located remotely with respect to each other, or alternatively, they may be located locally with respect to each other.

A typical MFD may act as a combination of a printer, scanner, photocopier, fax and e-mail. While three MFDs 140, 142, and 144 are shown by way of example, it is to be appreciated that any number of MFDs may be linked to the network, such as, four, six or more rendering devices. In general, the MFDs 140, 142, and 144 can be employed to perform a rendering output function (e.g., printing, scanning, copying, faxing, etc.) within a networked environment. Note that MFDs 140, 142, and 144 are generally analogous to one another.

The extensible interface platform module 280 and the authentication unit 285 are configured in association with the server 235 to access a network-based extensible interface platform without previous installation. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, the term "module" as utilized herein generally refers to such software modules or implementations thereof, but may in some instances refer to hardware. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, flash drives, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

The device management system 200 generally includes the extensible interface platform module 280 hosted on the network server 235 accessible via the network 135 in communication with the network server 235. In general, EIP is a software platform upon which developers can use standard web-based tools to create server-based applications that can be configured for the MFD's touch-screen user interface. Note that the networked server 235 can be, for example, a cloud-based server and the network 135 can be, for example, a cloud-based network.

As used herein, the term "cloud" can refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and reside within personal computers or local or 'on-premise' servers. In general, cloud computing can be employed to perform services in a dissociative way, i.e., the client may not know where the service is performed as long as the service is performed with the expected quality of service. Cloud computing can be employed to solve "grid" scale problems that may require an inordinate amount of time and resources for a single computer to solve. For example, in cloud computing mining large amounts of data from the fleet of MFDs 140, 142, and 144 can be broken into much smaller pieces that are executed in parallel, and the results can be combined at the end.

The network server 235 further includes the authentication unit 285 to authenticate an access to the MFD 140, 142, and 144 that communicates with the network server 235 via the network 135 in response to invoking a login procedure at the MFDs 140, 142, and 144. Note that the authentication unit 285 can be provided as a module (e.g., software module) or a group of such modules.

The authentication unit 285 automatically links a particular account to the network server 235 after authenticating access to the MFDs 140, 142, and 144. The network server 235 loads the extensible interface platform module 280 onto the local user interface such as, for example, user interface 145 associated with the MFD 140 to present an extensible interface platform workflow associated with the account even though the extensible interface platform module 280 is not installed at the MFD 140. The extensible interface platform module 280 can be hosted on the network server 235 as a file storage and/or synchronization service.

Figure 3:
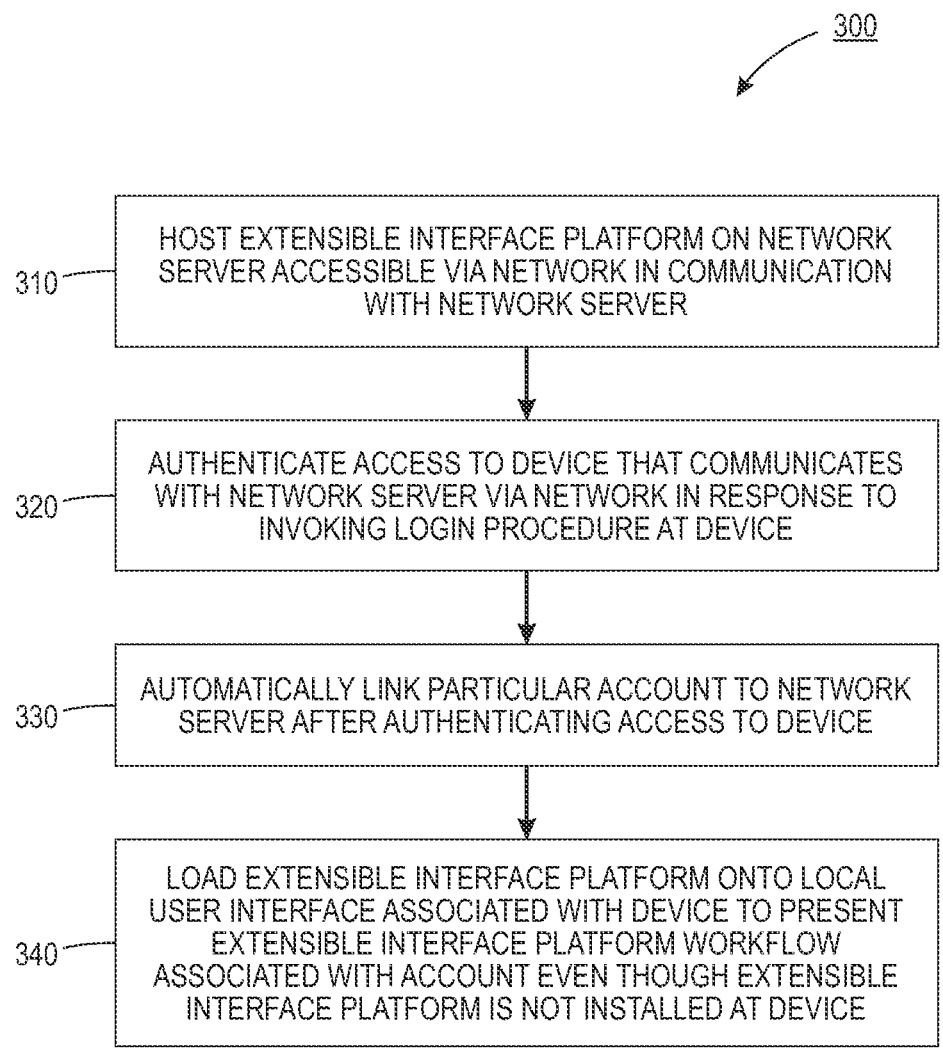
FIG. 3 illustrates a high level flow chart of operations illustrating logical operational steps of a method for accessing the network-based extensible interface platform module via multifunction devices without installation, in accordance with the disclosed embodiments.

FIG. 3 illustrates a high level flow chart of operations illustrating logical operational steps of a method 300 for accessing a network-based extensible interface platform module 280 via, for example, MFD's such as MFD 140, 142, and 144, etc., in accordance with a preferred embodiment. Note that in FIGS. 1-10, identical or similar blocks are generally indicated by identical reference numerals. As indicated at block 310, a step or logical operation can be implemented wherein the extensible interface platform module 280 can be hosted on the network server 235 accessible via the network 135 in communications with the network server 235.

Next, as indicated at block 320, a step or logical operation can be implemented, wherein access to the MFDs 140, 142, 144, etc., which communicate with the network server 235 via the network 135 can be authenticated in response to invoking a login procedure at the MFDs 140, 142, and 144. Thereafter, as illustrated at block 330, a step or logical operation can be implemented wherein a particular account is automatically linked to the network server 235 after authenticating access to the MFDs 140, 142, and 144. Then, as shown at block 340, a step or logical operation can be implemented, wherein the extensible interface platform module 280 is automatically loaded onto a local user interface 145 associated with the device 140 to present an extensible interface platform workflow associated with the account even though the extensible interface platform module 280 is not necessarily installed at the MFDs 140, 142, and/or 144.

A custom EIP solution can be hosted in the "cloud" via service such as, for example, Google Drive. When a user logs into a MFD, their account can be linked to their Google Drive account and the EIP solution hosted on Google Drive can be loaded on the local UI (User Interface) presenting the user with his or her specific workflow even though the EIP solution was never previously "installed" on the device.

Based on the foregoing, it can be appreciated that a number of embodiments are disclosed. For example, in one embodiment, a method for implementing a network-based extensible interface platform can be provided, which includes the steps or logical operations of, for example, authenticating access to a device that communicates with a network server via a network in response to invoking a login procedure at the device; automatically linking an account to the network server after authenticating access to the device; and loading an extensible interface platform onto a local user interface associated with the device to present an extensible interface platform workflow associated with the account even if the extensible interface platform is not installed at the device.

In another embodiment, a step or logical operation can be implemented for hosting the extensible interface platform via the network server, wherein the network server is accessible via a network in communication with the network server. In some embodiments, the aforementioned device may be, for example, a multi-function device. In another embodiment, the networked server can be a cloud-based server and the network is a cloud-based network. In still another embodiment, the extensible interface platform can be hosted on the network server as a file storage and/or synchronization service. In yet another embodiment, a step or logical operation can be processed for loading the extensible interface platform hosted on the network server on a user interface of the device in order to present a user with a specific workflow.

In another embodiment, a system can be configured for implementing a network-based extensible interface platform. Such a system can include, for example, a processor and a computer-usable medium embodying computer program code. The computer-usable medium is capable of communicating with the processor. The computer program code can include instructions executable by the processor and configured, for example, for authenticating access to a device that communicates with a network server via a network in response to invoking a login procedure at the device; automatically linking an account to the network server after authenticating access to the device; and loading an extensible interface platform onto a local user interface associated with the device to present an extensible interface platform workflow associated with the account even if the extensible interface platform is not installed at the device.

In another embodiment, such instructions can be further configured for hosting the extensible interface platform via the network server, wherein the network server is accessible via a network in communication with the network server. The aforementioned device may be a MFD. In some embodiments, the networked server can be a cloud-based server and the network can be a cloud-based network. In still other embodiments, the extensible interface platform can be hosted on the network server as a file storage and/or synchronization service.

In other embodiments, the instructions can be further configured for loading the extensible interface platform hosted on the network server on a user interface of the device in order to present a user with a specific workflow. In other embodiments, the instructions can be further configured for loading the extensible interface platform hosted on the network server on a user interface of the device in order to present a user with a specific workflow.

In another embodiment, a processor-readable medium storing code representing instructions to cause a process for implementing a network-based extensible interface platform can be implemented. Such code can include code to, for example: authenticate access to a device that communicates with a network server via a network in response to invoking a login procedure at the device; automatically link an account to the network server after authenticating access to the device; and load an extensible interface platform onto a local user interface associated with the device to present an extensible interface platform workflow associated with the account even if the extensible interface platform is not installed at the device.

In another embodiment, such code can further include code to host the extensible interface platform via the network server, wherein the network server is accessible via a network in communication with the network server. In another embodiment, the aforementioned device may be a multi-function device, the networked server can be a cloud-based server and the network is preferably a cloud-based network. In another embodiment, the extensible interface platform can be hosted on the network server as a file storage and/or synchronization service. In yet another embodiment, the aforementioned code can further include code to load the extensible interface platform hosted on the network server on a user interface of the device in order to present a user with a specific workflow.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for implementing a network-based extensible interface platform, said method comprising:
   authenticating by processing via a computer access to an electronic device that communicates electronically with a network server via a network, in response to invoking a login procedure at said electronic device, said network server comprising a cloud-based server and said network comprising a cloud-based network;
   automatically electronically linking an account to said network server after authenticating access to said electronic device; and
   loading an extensible interface platform onto a local user interface associated with said electronic device to present and graphically display via said local user interface an extensible interface platform workflow associated with said account even if said extensible interface platform was not previously installed at said electronic device, said extensible interface platform hosted on said network server as a file storage and synchronization service.

2. The method of claim 1 further comprising hosting said extensible interface platform via said network server, wherein said network server is accessible via a network in communication with said network server.

3. The method of claim 1 wherein said electronic device comprises a multi-function device.

4. The method of claim 1 wherein said networked server comprises a cloud-based server and said network comprises a cloud-based network.

5. The method of claim 1 wherein said extensible interface platform is hosted on said network server as a file storage and/or synchronization service.

6. The method of claim 1 further comprising loading said extensible interface platform hosted on said network server on a user interface of said device in order to present a user with a specific workflow.

7. The method of claim 6 wherein said extensible interface platform is hosted on said network server as a file storage and/or synchronization service.

8. The method of claim 6 wherein said networked server comprises a cloud-based server and said network comprises a cloud-based network.

9. A system for implementing a network-based extensible interface platform, said system comprising:
   a processor; and
   a non-transitory computer-usable medium embodying computer program code, said non-transitory computer-usable medium capable of communicating with said processor, said computer program code comprising instructions executable by said processor and configured for:
   authenticating by processing via said processor, access to an electronic device that communicates electronically with a network server via a network, in response to invoking a login procedure at said electronic device, said network server comprising a cloud-based server and said network comprising a cloud-based network;
   automatically electronically linking an account to said network server after authenticating access to said electronic device; and
   loading an extensible interface platform onto a local user interface associated with said electronic device to present and graphically display via said local user interface an extensible interface platform workflow associated with said account even if said extensible interface platform was not previously installed at said electronic device, said extensible interface platform hosted on said network server as a file storage and synchronization service.

10. The system of claim 9 wherein said instructions are further configured for hosting said extensible interface platform via said network server, wherein said network server is accessible via a network in communication with said network server.

11. The system of claim 9 wherein said electronic device comprises a multi-function device.

12. The system of claim 9 wherein said networked server comprises a cloud-based server and said network comprises a cloud-based network.

13. The system of claim 9 wherein said extensible interface platform is hosted on said network server as a file storage and/or synchronization service.

14. The system of claim 9 wherein said instructions are further configured for loading said extensible interface platform hosted on said network server on a user interface of said device in order to present a user with a specific workflow.

15. The system of claim 10 wherein said instructions are further configured for loading said extensible interface platform hosted on said network server on a user interface of said device in order to present a user with a specific workflow.

16. A non-transitory processor-readable medium storing code representing instructions to cause a process for implementing a network-based extensible interface platform, said code comprising code to:
   authenticate by processing via a computer access to an electronic device that communicates electronically with a network server via a network, in response to invoking a login procedure at said electronic device, said network server comprising a cloud-based server and said network comprising a cloud-based network;
   automatically electronically link an account to said network server after authenticating access to said device; and
   load an extensible interface platform onto a local user interface associated with said electronic device to present and graphically display via said local user interface an extensible interface platform workflow associated with said account even if said extensible interface platform was not previously installed at said electronic device, said extensible interface platform hosted on said network server as a file storage and synchronization service.

17. The processor-readable medium of claim 16 wherein said code further comprises code to host said extensible interface platform via said network server, wherein said network server is accessible via a network in communication with said network server.

18. The processor-readable medium of claim 16 wherein said electronic device comprises a multi-function device and wherein said networked server comprises a cloud-based server and said network comprises a cloud-based network.

19. The processor-readable medium of claim 16 wherein said extensible interface platform is hosted on said network server as a file storage and/or synchronization service.

20. The processor-readable medium of claim 16 wherein said code further comprises code to load said extensible interface platform hosted on said network server on a user interface of said device in order to present a user with a specific workflow.

* * * * *